May 19, 1942.   E. O. STEUDEL   2,283,704
DISPLAY HOLDER FOR BAKERY GOODS
Filed June 21, 1940
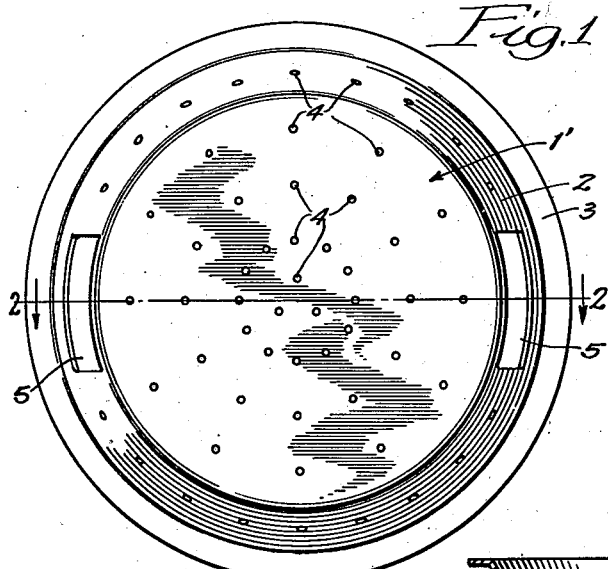
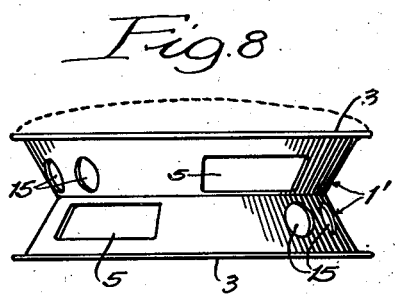
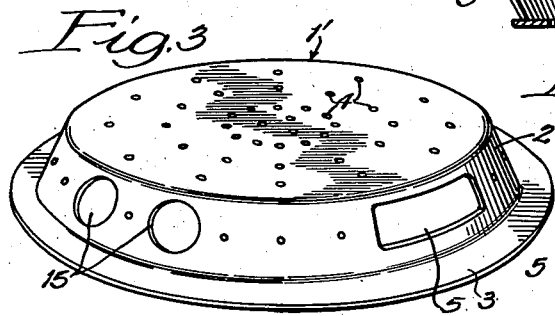
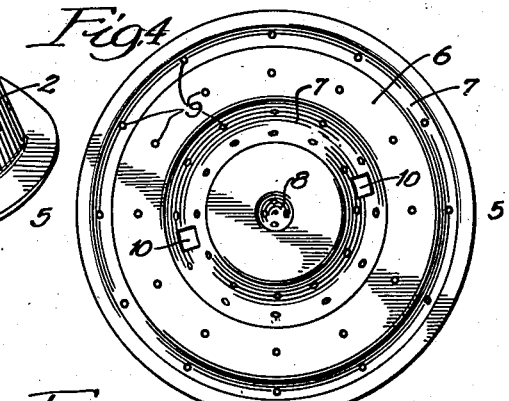
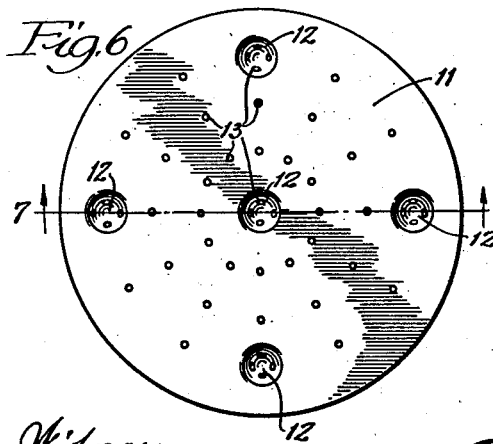
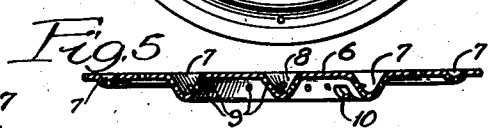
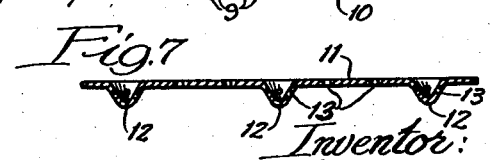
Inventor:
Erich O. Steudel,
Witnesses:
By Rummler, Rummler & Davis
Attorneys.

Patented May 19, 1942

2,283,704

UNITED STATES PATENT OFFICE 2,283,704

DISPLAY HOLDER FOR BAKERY GOODS

Erich O. Steudel, Chicago, Ill.

Application June 21, 1940, Serial No. 341,641

2 Claims. (Cl. 229—2.5)

This invention relates to improvements in food receptacles; and more particularly to pie and cake plates and to methods of using the same.

It is now common practice in bakeries, upon baking pies and cakes, to remove them immediately from the oven tins or pans and to place them in or upon other receptacles of more appropriate character and appearance and of a somewhat stiff fibrous material, which the customers receive with the articles of purchase.

This practice has not been entirely satisfactory because the vapors and warm air or gases become trapped in and below the food article causing its crust soon to become saturated with hot vapors and consequently become soggy. Such vapor also prevents surface dryness and retards quick cooling of the baked article to a degree such that the same may be properly frosted or otherwise decorated as the case may be.

Furthermore, for display purposes, it is customary to invert one holder or "pie plate" to serve as a bottom support and to place thereon another such plate with the baked article therein. In order to remove such article in its plate from the lower plate or support it has been customary for lack of greater convenience, to shift both plates to the edge of the display rack or shelf in order to be able to grasp and tip the assembly and to put a hand under the container plate, as for necessary sales handling. Otherwise, if the outer edge of the plate were grasped there would be danger of deforming or breaking the crust or icing.

It was to cure these defects that the present invention was directed. Other and more specific objects are to provide a pie or cake plate with positive ventilating means; to so make such a plate that it will retain its normal form and stiffness, in use, and may readily be grasped and raised when used for display and sales purposes; to provide suitable means or form in a plate to allow for ready access to the lower crust or bottom of a pie or cake when placed in such a receptacle; and to provide a simple and inexpensive device of this character capable of meeting present bakery needs and which will appear neat and pleasing to bakery customers.

This invention is illustrated by the accompanying drawing in which:

Figure 1 is a top plan view of a pie plate.

Fig. 2 is a sectional view taken on the line 2—2 of Fig. 1.

Fig. 3 is a perspective view of a somewhat modified pie plate shown bottom side up.

Fig. 4 is a top plan view of a "cake circle" showing my invention incorporated therein.

Fig. 5 is a sectional view taken on the line 5—5 of Fig. 4.

Fig. 6 is a top plan view of a modified form of the cake circle shown in Fig. 4.

Fig. 7 is a sectional view taken on the line 7—7 of Fig. 6, and

Fig. 8 is a side view of a pair of pie plates as they are employed for display purposes.

Referring further to the embodiment of Figs. 1, 2 and 3, the molded pie plate 1' comprises a fibrous bottom or article bearing part 1 having a flared peripheral side wall 2 and a flange 3. The bottom 1 and wall 2 are provided each with a series of perforatory apertures 4 spaced throughout the effective pie contacting area of the plate to allow for the escape of gas and vapors emanating from the article placed therein. The walls 2 are also provided with two or more elongated slots 5 which serve both to provide for ready access to the bottom of the crust of the article placed in the plate, so that a knife or other instrument may be inserted between the bottom of the pie plate and the article placed therein, and to provide a means whereby the fingers of the hand may readily be inserted therein, as through openings 5, for ready withdrawal of the pie plate with its article from the display rack. It is to be understood that pie plates are usually inverted for supports and that pie plates bearing the articles to be sold are placed thereon for display purposes.

In Figs. 4 to 7, inclusive, I have illustrated two improved forms of cake circles, made of fibrous material such as disclosed in my Reissue Patent #19,813 granted January 7, 1936.

The device of Figs. 4 and 5 comprises a flat cake-bearing body portion 6, having downward channels 7 forming circular ribs and a centrally disposed depression 8 about which said ribs are concentric. In this circle I have provided a series of small perforations 9 spaced throughout the cake bearing portion of the circle and also in the ribs 7 and depression 8. And I also provide a plurality of mutually spaced larger apertures 10 in the side walls of the channels 7. The form shown in Figs. 6 and 7 comprises a flat cake bearing portion 11 having downward depressions 12 which serve as feet to support said portion 11 horizontally. I have also distributed apertures 13 throughout the cake bearing portion 11 and the side walls of the feet 12.

It will now be apparent that all vapors and hot air emanating from the bottom of a cake placed on either of said circles will pass out through the apertures 9 in the cake bearing portions 6 or 11, or into the depressions 8 or 12 and thence outwardly through the apertures 10 or 13; or in the case of the device shown in Figs. 4 and 5, the hot air and vapors will also pass out through the larger apertures 10 in the walls of channels 7.

It will also be apparent that when a hot article is placed in the pie plate 1' or on either cake circle any hot vapors or gas emanating from the articles will immediately pass out into the atmosphere through the apertures therefor which are spaced throughout the effective areas of the devices, and hence thereby substantially eliminating the possibility of the bottom crust of the article becoming soggy as is the case when the hot vapors and gases are trapped therein.

As it is customary in invert a pie plate for support, and to place thereon another pie plate with the article to be sold contained therein for display purposes, it has been impossible heretofore to remove the pie plate with its article from the inverted plate by merely grasping the same and removing it. It was necessary to shift the inverted plate and the pie containing plate to the edge of the display counter or rack and then to slide the pie containing plate with its contents off the inverted plate onto the hand. Even this cautious method of removing the pie plate with its contents is not satisfactory because of the great possibility of cracking the top crust or the cake icing. But, using my system, it will be apparent from Fig. 8 of the drawing that it is only necessary to place the fingers of the hand through the slots 6 of the lower plate and then raise both plates in one movement. Although long slots have been specifically referred to and shown only in Figs. 1, 2 and 3, it is to be understood that any form of large opening may be utilized just so long as it is adequate to receive the fingers, for instance round fingerholes 15 on Fig. 3.

Heretofore wedges or cuts of pies particularly have been extremely hard to remove from the pie plate without mutilation of the cut. This is especially true of the first cut. The reason for this is that a knife or other cut raising apparatus must first be inserted between the pie crust and the wall of the plate and then on the bottom of the plate and the bottom crust. By utilizing the elongated apertures 5 in my present construction it can readily be seen that a knife or other device may be inserted through the slot 5 and between the bottom of the pie plate and the bottom crust of the pie as the knife is inserted along the inner face of the plate, on a horizontal plane, thereby loosening the pie from the bottom of the plate for its ready withdrawal from the pie plate in the usual manner.

It is to be understood that some of the details set forth may be altered or omitted without departing from the spirit of the invention as defined by the following claims.

I claim:

1. A plate of the character described comprising a sheet of fibrous material formed with a bottom surface having perforations scattered through substantially the entire area thereof, and an outwardly flaring side wall having oppositely disposed elongated finger and knife receiving openings therein and also provided with a plurality of perforations between said finger and knife receiving openings, at least one of said finger and knife receiving openings having the lower straight edge thereof substantially in the plane of the bottom surface of the plate for insertion of a knife between the article contained therein and the bottom surface of the plate so as to facilitate the removal of the article from the plate.

2. A plate of the character described comprising a sheet of fibrous material formed with a bottom surface and an outwardly flaring side wall having oppositely disposed elongated finger and knife receiving openings therein, at least one of said finger and knife receiving openings having the lower straight edge thereof substantially in the plane of the bottom surface of the plate for insertion of a knife between the article contained therein and the bottom surface of the plate so as to facilitate the removal of the article from the plate.

ERICH O. STEUDEL.